(12) United States Patent
Kwong et al.

(10) Patent No.: US 9,006,645 B2
(45) Date of Patent: *Apr. 14, 2015

(54) COMBINED SONIC/PULSED NEUTRON CASED HOLE LOGGING TOOL

(71) Applicant: Halliburton Energy Services, Inc., Houston, TX (US)

(72) Inventors: Kwokshan Kwong, Houston, TX (US); Daniel Francois Dorffer, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/109,615

(22) Filed: Dec. 17, 2013

(65) Prior Publication Data

US 2014/0103202 A1    Apr. 17, 2014

Related U.S. Application Data

(63) Continuation of application No. 13/701,874, filed as application No. PCT/US2010/049146 on Sep. 16, 2010, now Pat. No. 8,637,806.

(51) Int. Cl.
   *G01V 5/00* (2006.01)
   *G01V 5/04* (2006.01)
   (Continued)

(52) U.S. Cl.
   CPC *G01V 5/04* (2013.01); *G01V 5/102* (2013.01); *G01V 11/00* (2013.01); *G01V 1/40* (2013.01); *G01V 2210/6167* (2013.01)

(58) Field of Classification Search
   CPC ..... G01V 11/00; G01V 11/002; G01V 5/102; G01V 5/108

USPC .......................................... 250/269.1–269.8
See application file for complete search history.

(56) References Cited

U.S. PATENT DOCUMENTS 4,095,102 A    6/1978 Tixier
5,808,191 A    9/1998 Alexy, Jr. et al.
(Continued)

FOREIGN PATENT DOCUMENTS

EP    0 718 641 B1    8/2003

OTHER PUBLICATIONS

Authorized officer Blaine R. Copenheaver, International Search Report and Written Opinion in International Application No. PCT/US2010/049146, mailed Nov. 15, 2010, 20 pages.

(Continued)

*Primary Examiner* — Kiho Kim
(74) *Attorney, Agent, or Firm* — Anthony Iannitelli; Fish & Richardson P.C.

(57) ABSTRACT

A through casing formation evaluation tool string 1000, 2000, 3000 including a conveyance string 100, a sonic array tool 200, a pulsed neutron tool 400 and one or more downhole memory modules 160, 540, 550. A method of through casing formation evaluation and casing and cementing integrity evaluation includes lowering a tool string into a cased wellbore; concurrently collecting data with the sonic array tool and pulsed neutron tool and transmitting at least a portion of the collected data via a conveyance string to a CPU located at the surface of the earth; storing a portion of the collected data in a memory module disposed in the tool string; removing the tool string from the wellbore; processing the collected data in the CPU to obtain selected rock property data about the one or more of the geologic formations and/or cement integrity.

34 Claims, 4 Drawing Sheets

(51) Int. Cl.
  *G01V 5/10* (2006.01)
  *G01V 11/00* (2006.01)
  *G01V 1/40* (2006.01)

(56) References Cited

U.S. PATENT DOCUMENTS

| | | | |
|---|---|---|---|
| 7,265,649 | B1 | 9/2007 | Hall et al. |
| 7,292,942 | B2 | 11/2007 | Ellis et al. |
| 7,342,222 | B2 | 3/2008 | Griffiths et al. |
| 7,398,837 | B2 | 7/2008 | Hall et al. |
| 2003/0216866 | A1* | 11/2003 | Edward Calvert et al. ....... 702/8 |
| 2005/0067563 | A1 | 3/2005 | Gilchrist et al. |

OTHER PUBLICATIONS

Market, J.; Canady, W.; "Multipole Sonic Logging in High-Angle Wells"; SPWLA 50$^{th}$ Annual Logging Symposium, Jun. 21-24, 2009, 16 pages.

Mullen, M.; Roundtree, R.; Barree, B.; "A Composite Determination of Mechanical Rock Properties for Stimulation Design (What to Do When You Don't Have a Sonic Log)"; SPE 108139; 2007 SPE Rocky Mountain Oil & Gas Technology Symposium, Apr. 16-18, 2007, 13 pages.

Buller, D.; Kwong, S.; Spain, D.; Miller, M.; "A Novel Approach to Shale-Gas Evaluation Using a Cased-Hole Pulsed Neutron Tool"; SPWLA 51$^{st}$ Annual Logging Symposium, Jun. 19-23, 2010, 15 pages.

"RMT Elite™ Reservoir Monitor Tool, The Industry's Most Accurate and Repeatable Slim-Hole Through-Tubing Carbon/Oxygen Logging System", Halliburton Wireline and Perforating Services, Jan. 2008, 4 pages.

"RSTPro Water saturation, lithology, and porosity through casing", Schlumberger, Jul. 2006, 7 pages.

"Dual-Spaced Epithermal Neutron Log Tool (DESN™)", Halliburton Wireline and Perforating Services, 2009 [retrieved on Feb. 28, 2009] Retrieved from the Internet: <URL: http://cms.corp.halliburton.com/iw/cci/meta/no-injection/iw-mount/default/main/PS/lp/W . . . , 2 pages.

"Neutron Porosity Tools", Schlumberger, Aug. 2004, 2 pages.

Barajas, J.; Patino, A.; Garcia, E.; Mesa, H.; Tome, J.; Kessler, C.; Varsamis, G.; Blanch, J.; "Case History—Cased Hole Dipole Sonic Applications in Mexico"; SPE Annual Technical Conference and Exhibition, Sep. 26-29, 2004; 17 pages.

Authorized officer Kiho Kim, Written Opinion of the International Preliminary Examining Authority in International Application No. PCT/US10/49146, mailed Aug. 14, 2012, 18 pages.

Authorized officer Kiho Kim, International Preliminary Report on Patentability in International Application No. PCT/US10/49146, mailed Nov. 14, 2012, 17 pages.

* cited by examiner

COMBINED SONIC/PULSED NEUTRON CASED HOLE LOGGING TOOL

CLAIM OF PRIORITY

This application is a continuation of and claims the benefit of priority to U.S. patent application Ser No. 13/701,874, entitled "Combined Sonic/Pulsed Neutron Cased Hole Logging Tool", filed on Aug. 12, 2013, which claims priority under 35 USC §365 (c) to International Patent Application Serial No. PCT/US2010/049146, entitled "Combined Sonic/Pulsed Neutron Cased Hole Logging Tool", filed on Sep. 16, 2010, which is incorporated herein by reference in its entirety.

TECHNICAL FIELD

This disclosure relates to formation and casing evaluation tools and methods of formation evaluation, and more particularly a combination sonic and pulsed neutron tool for formation evaluation through casing, and casing and cementing integrity evaluation and methods for use for same.

BACKGROUND

In many reservoirs throughout the world it is necessary to hydraulically fracture the reservoir to produce commercial quantities of oil and gas. In order to design such hydraulic fracture stimulation treatments it is desirable to understand the in-situ stress profiles. To calculate the in-situ stress profile it is desirable to have mechanical rock properties and pore pressure data in and around the target producing zones of the reservoir. Previously, it was necessary to obtain much of the needed data used in the stimulation designs with logs run in an open hole environment, while the well was being drilled, or in open hole logging runs after the desired interval had been penetrated and before casing had been placed in the wellbore. Obtaining the data in an open hole environment while the drilling rig is on location results in the well operator incurring the cost of the drilling rig time while the logging operation is conducted. Additionally, it is sometimes necessary to remove the drill string and bit and then rerun the drill string and bit to the bottom of the hole and remove it again (aka "make a wiper trip in and out of the hole") to circulate and condition the drilling fluids (aka "drilling mud") to prepare the open hole for formation evaluation tools. This conditioning of the open hole results in additional costs for the drilling fluids and additional rig time costs. Use of an open hole formation evaluation tool (aka "open hole logging") has some risks. In highly deviated and/or horizontal wells it is sometimes difficult to get the open hole formation evaluation tools (aka "logging tools") to the portion of the wellbore in the desired geologic intervals, necessitating additional rig time and expense. It is also possible that the logging tools may become stuck in the wellbore which may necessitate expensive retrieval operations (aka "fishing operations") to retrieve the stuck logging tools. If the logging tools are not able to be retrieved, it may be necessary to drill a replacement portion for the wellbore or even abandon the wellbore and drill a new well.

A need exists for obtaining formation evaluation data (aka "log data") to be used in wellbore design and hydraulic fracture stimulation design in an alternative manner to open hole logging. A further need exists for a cased hole combination logging tool for use in analyzing casing(s) and cement integrity in a well bore.

SUMMARY

The present disclosure provides an alternative through casing formation evaluation tool to open hole formation evaluation tools by combining pulsed neutron and sonic technology in a mono-cable format for use in a single cased hole logging run. This is an efficient and cost saving approach to obtaining the desired formation evaluation data (aka "log data") for well design and hydraulic stimulation design and for a cased hole combination logging tool for use in analyzing casing(s) and cement integrity in a wellbore. Since the wellbore is cased, the drilling rig may be removed before a logging run using the tool of the present disclosure, and therefore considerable money is saved by avoiding the rig time incurred during open hole logging. The combined tool and method of the present disclosure also saves money by making only a single cased hole logging trip versus several trips necessary to obtain the data using individual tools each in a single logging run. Risk of losing logging tools in the well is minimized by using cased hole logging versus open hole logging. It is generally easier to get the logging tools to the desired geologic zones in a cased hole as opposed to an open hole, especially in highly deviated or horizontal wellbores. Risk of losing tools in a cased hole is minimized by using a single logging run with the combination tool in the cased hole instead of multiple runs with single tools.

The data obtained with the combined tool of the present disclosure provides formation measurements through casing(s) and cement. The tools may obtain data on casing(s) string and cement integrity; fluids saturations and rock properties of the reservoir; including DTC (compressional slowness); DTS (shear slowness); minimum horizontal stress profile; porosity; simple mineralogy; matrix sigma; pseudo density; and full wave information. The robustness of the gathered data is useful for optimal well design and for improved hydraulic fracture and acidization stimulation design and placement used in completing and stimulating the well and for determining the integrity of one or more casing strings and cement in the wellbore.

In some embodiments, the combined tool string may be less than 3 inches in outside diameter, thereby allowing for ease of conveyance of the tool string in small internal diameter cased wellbores, tubing, drill pipe and within highly deviated and horizontal wellbores (aka "high dog leg" severity).

The combined pulsed neutron and sonic cased hole formation evaluation may be accomplished in several ways: real time gathered data transmitted via an electrical or fiber optic cable, or wired continuous rod; memory mode by storing a portion of the gathered data in memory module(s) in the tool string and conveyed on above cables or slickline or wired continuous rod; and in a hybrid telemetry method where a portion of the gathered data is transmitted via an electrical or fiber optic cable or continuous wired rod and a portion of the gathered data is stored in the memory modules(s) in the tool string and retrieved when the tool string is removed from the wellbore.

The collected data is processed in a CPU at the surface to obtain more robust rock property data about the one or more geologic formations. The rock properties are selected from the group consisting of Poisson's Ratio, Young's Modulus, compression slowness, shear slowness, minimum horizontal stress profile and inelastic measurements leading to simple mineralogy and matrix sigma (Spwla_2009_T), Sigma (or capture cross-section) and ratio measurement for porosity (SPE30597) and pseudo density (SPE94716). The robustness of the processed rock property data is useful for optimal well design and for improved hydraulic fracture and acidization stimulation design and placement used in completing and stimulating the well and for determining the integrity of one or more casing strings and cement in the wellbore.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
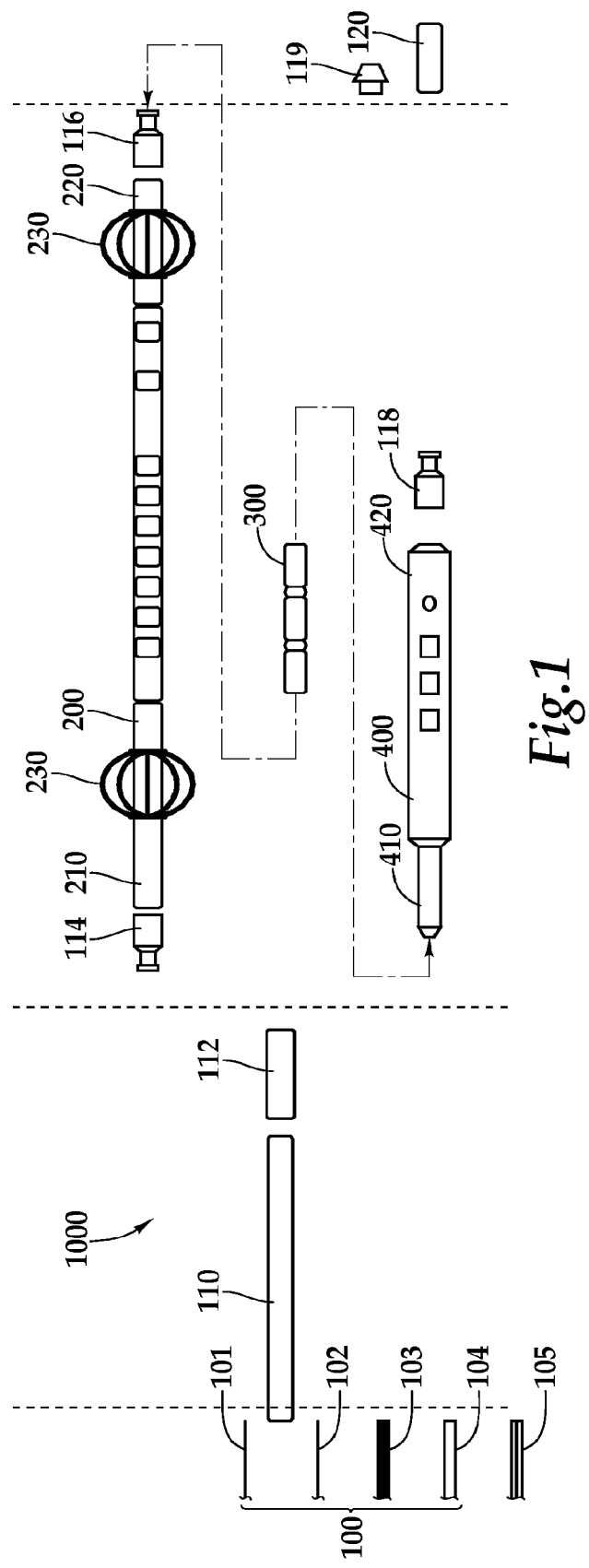
FIG. 1 is a schematic of a first implementation of a combination sonic and pulsed neutron tool for formation evaluation through casing.

Referring now to FIG. 1, wherein there is illustrated a schematic of a first embodiment of the combination logging tool string 1000 for use inside of a cased wellbore. The logging tool string 1000 is conveyed into the wellbore on a conveyance string 100 which may include one or more of the following: an electric and/or fiber optic cable 101; a slickline cable 102; a wired conveyance rod 103; coiled tubing string 104; and a wired coiled tubing string (including electrical cable and/or fiber optics) 105. The tool string 1000 includes: a gamma ray/casing collar telemetry module 110 connected to a first crossover tool 112. A second crossover tool 114 may be used to connect the first crossover tool to a first end 210 of a sonic array tool 200. The sonic array tool may include centralizers 230. A third crossover tool 116 may be used to connect a lower end 220 of the sonic array tool to a flexible sub 300 (aka "serpentine or knuckle joint") that allows decoupling of a centralized tool. A pulsed neutron tool 400 may be connected at a first end 410 to a second end of the flexible sub 300. In some embodiments, in the tool string 1000, the sonic array tool 200 is disposed above the flexible sub 300 and the pulsed neutron tool 400 is disposed below the flexible sub. Alternatively, the pulsed neutron tool 400 may be disposed above the flexible sub 300 and the sonic array tool 200 may be disposed below the flexible sub 300. If the pulsed neutron tool 400 is below the sonic tool 200, a crossover tool 116 may be used to receive either a termination bull plug 119 at the lower end of the tool string or, alternatively, an additional crossover 120 may be attached to crossover 116 to connect to additional tools (not shown) that may be used in the string 1000. If the sonic tool 200 is positioned below the neutron tool 400, then a crossover tool 118 may be used to receive either a termination bull plug 119 at the lower end of the tool string 1000 or, alternatively, an additional crossover 120 may be attached to crossover 118 to connect to additional tools (not shown) that may be used in the string 1000.

By way of example, a Halliburton mono-cable telemetry module model 1553 may be used in combination with Halliburton's slim bore hole sonic array tool (SBSAT) and Halliburton's pulsed neutron tool model RMT-i or TMD-3d (1553). The flexible sub 300 may be Halliburton's 6-6 flex connector. It will be understood that other telemetry modules and sonic array tools and neutron tools and flexible subs manufactured and provided by Halliburton and/or other third parties may be used in implementations of the present disclosure.

By way of further explanation, the present disclosure as discussed above may use a continuous wired rod (103) that includes the features of encapsulating fiber optic and/or copper wire within a smooth, round semi rigid outer layer(s). The rigidity of the continuous wired rod may allow pushing/pulling tool strings, possibly eliminating mechanical tractors.

Figure 2:
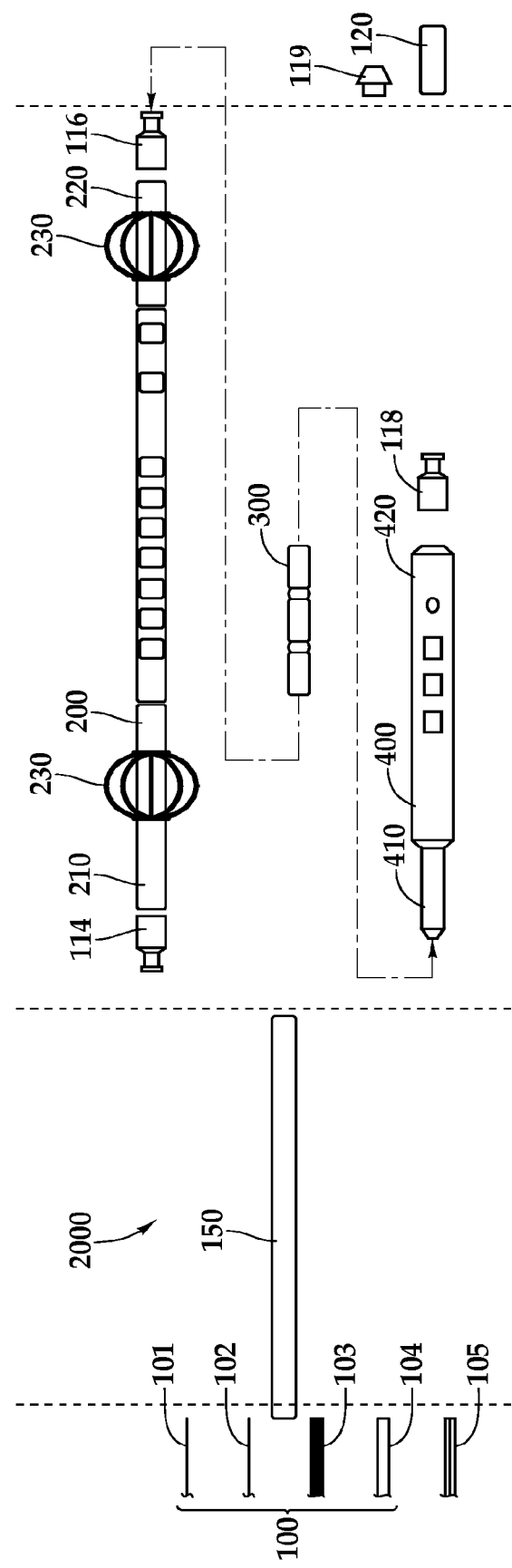
FIG. 2 is a schematic of a second implementation of a combination sonic and pulsed neutron tool for formation evaluation through casing.

Referring now to FIG. 2, wherein there is illustrated a schematic of an alternative implementation of the combination logging tool string 2000 for use inside of a cased wellbore. The logging tool string 2000 is conveyed into the wellbore on a conveyance string 100 which may include one or more of the following: an electric and/or fiber optic cable 101; a slickline cable 102; a wired conveyance rod 103 (see discussion hereinafter); coiled tubing string 104; and a wired coiled tubing string (including electrical cable and/or fiber optics) 105. The tool string 2000 includes: a memory module 150 which is connected to a crossover tool 114. The memory module is connected to a first end 210 of a sonic array tool 200. A crossover tool 116 may be used to connect the lower end 220 of the sonic array tool to a flexible sub 300. A pulsed neutron tool 400 is connected at a first end 410 to a second end of the flexible sub 300. In some embodiments in the tool string 1000, the sonic array tool 200 is disposed above the flexible sub 300 and the pulsed neutron tool 400 is disposed below the flexible sub 300. Alternatively, the pulsed neutron tool 400 may be disposed above the flexible sub 300 and the sonic array tool 200 may be disposed below the flexible sub 300. If the pulsed neutron tool 400 is below the sonic tool 200, a crossover tool 116 may be used to receive either a termination bull plug 119 at the lower end of the tool string or, alternatively, an additional crossover 120 may be attached to crossover 116 to connect to additional tools (not shown) that may be used in the string 2000. If the sonic tool 200 is positioned below the neutron tool 400, then a crossover tool 118 may be used to receive either a termination bull plug 119 at the lower end of the tool string or, alternatively, an additional crossover 120 may be attached to crossover 118 to connect to additional tools (not shown) that may be used in the string 2000.

Figure 3:
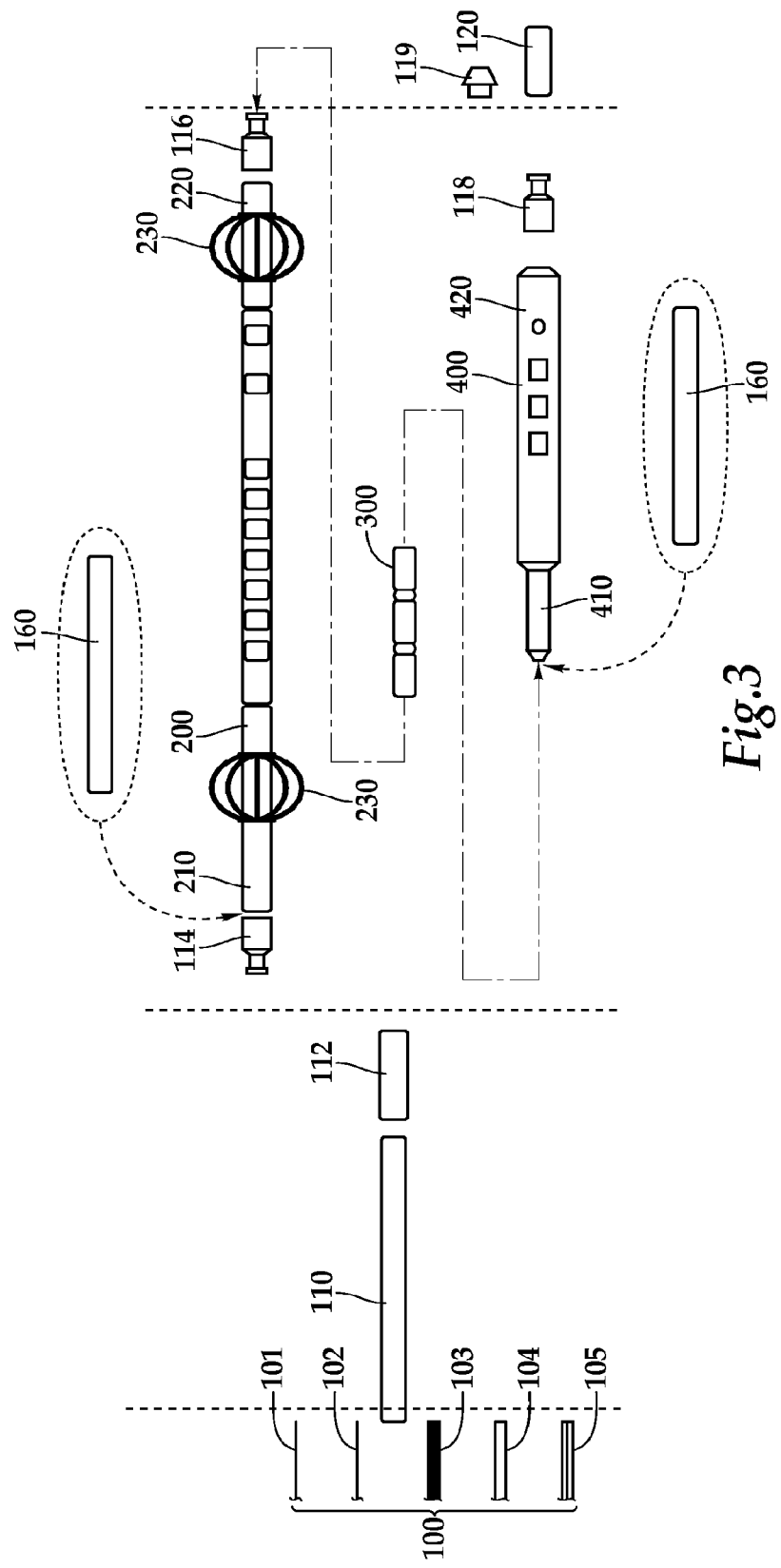
FIG. 3 is a schematic of a third implementation of a combination sonic and pulsed neutron tool for formation evaluation through casing.

Referring now to FIG. 3, wherein is illustrated a schematic of an alternative implementation of a combination logging tool string 3000. The alternative tool string 3000 is similar to the first embodiment of the combination logging tool string 1000 for use inside of a cased wellbore. The tool string 3000 is conveyed into the wellbore on a conveyance string 100 which may include one or more of the following: an electric and/or fiber optic cable 101; a slickline cable 102; a wired conveyance rod 103 or coiled tubing string 104; a wired coiled tubing string (including electrical cable and/or fiber optics) 105. The tool string 3000 may include: a gamma ray/casing collar telemetry module 110 which is connected to a first crossover tool 112. A second crossover tool 114 may be used to connect the first crossover tool to a first end 210 of a sonic array tool 200. A third crossover tool 116 may be used to connect the lower end 220 of the sonic array tool to a flexible sub 300. A pulsed neutron tool 400 is connected at a first end 410 to a second end of the flexible sub 300. In some embodiments in the tool string 1000, the sonic array tool 200 is disposed above the flexible sub 300 and the pulsed neutron tool 400 is disposed below the flexible sub 300. Alternatively, the pulsed neutron tool 400 may be disposed above the flexible sub 300 and the sonic array tool 200 may be disposed below the flexible sub 300. The alternative tool string 3000 further includes a memory module 150 connected to the sonic array tool 200 and may include a second memory module 150 connected to the pulsed neutron tool 400. If the pulsed neutron tool 400 is below the sonic tool 200, a crossover tool 116 may be used to receive either a termination bull plug 119 at the lower end of the tool string or, alternatively, an additional crossover 120 may be attached to crossover 116 to connect to additional tools (not shown) that may be used in the string 2000. If the sonic tool 200 is positioned below the neutron tool 400, then a crossover tool 118 may be used to receive either a termination bull plug 119 at the lower end of the tool string 3000 or, alternatively, an additional crossover 120 may be attached to crossover 118 to connect to additional tools (not shown) that may be used in the string 3000.

Figure 4:
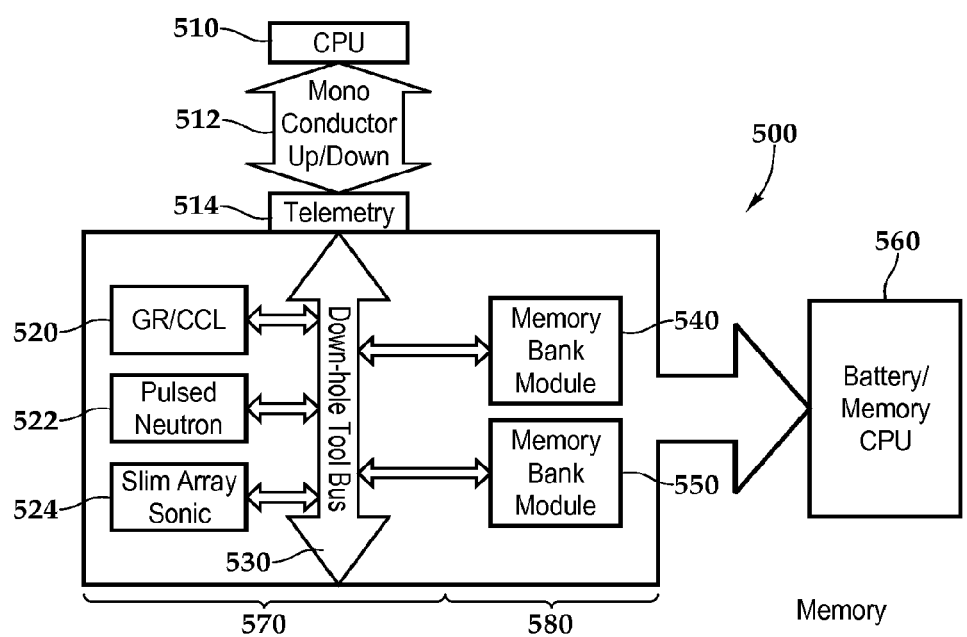
FIG. 4 is a functional schematic of possible combinations of the elements of a combination sonic and pulsed neutron tool and system.

Referring to FIG. 4, there is illustrated a functional schematic of possible combinations of the elements of a formations evaluation system 500. The system may include a CPU 510 located at the surface. A mono conductor 512 may be used to transmit data up or down the mono-cable to or from the formations evaluation tools comprising the tool string when the tool string is lowered into a cased wellbore. The mono-cable is connected to a telemetry module 514. A downhole tool bus 530 is included in the tool string. A gamma ray casing collar module 520 may be included in the string. A pulsed neutron module 522 and a sonic array module 524 may be included as is illustrated in section 570 of the system. In a hybrid embodiment 580, memory bank modules 540 may receive and store data from one or more of the gamma ray/casing collar tool 520, the pulsed neutron tool 522, and the slim array sonic tool 524; alternatively, an additional memory bank module 550 may be included in the tool string system 500 to receive and store data from one or more of the gamma ray/casing collar tool 520, the pulsed neutron tool 522, and the slim array sonic tool 524. The tool string may further include a battery pack and a memory CPU module 560.

The tool string 1000, as previously described, may be assembled by connecting a conveyance string 100 to a gamma ray/casing collar telemetry module 110; connecting a flexible sub 300 at first end to a sonic array tool 200; connecting a pulsed neutron tool 400 at a second end of the flexible sub. Alternatively, the pulsed neutron tool 400 may be disposed above the flexible sub 300 and the sonic array tool 200 may be disposed below the flexible sub 300. In operation, the tool string is lowered into the cased wellbore via the electric mono-cable. The tool string is passed inside the well casing across one or more geologic formations which are outside the wellbore casing. Data is collected with the sonic array tool and the pulsed neutron tool and transmitted via the electric mono-cable to a CPU 510 located at the surface of the earth. The collected data is processed to obtain selected rock property data about the one or more geologic formations. The rock properties are selected from the group consisting of Poisson's Ratio, Young's Modulus, compression slowness, shear slowness, minimum horizontal stress profile, porosity, simple mineralogy, matrix sigma, and pseudo density. Additionally, the tool string 1000 may gather data for determining the integrity of one or more casing strings and cement in the wellbore. The pulsed neutron log may gather data on gas effect and fluid flow behind and between casing strings. The sonic tool may gather data on the cement bond between the casing and the cement and the cement and the formation.

The tool string 2000, as previously described, may be assembled by connecting a slickline 102 or coiled tubing string 104 to a sonic array tool 200. The flexible sub 300 is connected at one end to the sonic array tool 200 and at a pulsed neutron tool 400 at a second end of the flexible sub. Alternatively, the pulsed neutron tool 400 may be disposed above the flexible sub 300 and the sonic array tool 200 may be disposed below the flexible sub 300. In operation, the tool string 2000 is lowered into the cased wellbore via the slickline or coiled tubing string. The tool string is passed inside the well casing across one or more geologic formations outside of the cased wellbore. Data is collected with the sonic array tool and the pulsed neutron tool and stored in the memory module(s) 150. The tool string 2000 is removed from the wellbore and the collected data is retrieved from the memory module 150 and processed to obtain selected rock property data about the one or more geologic formations. The rock properties are selected from the group consisting of Poisson's Ratio, Young's Modulus, compressional slowness, shear slowness, minimum horizontal stress profile, porosity, simple mineralogy, matrix sigma, and pseudo density. Additionally, the tool string 2000 may gather data for determining the integrity of one or more casing strings and cement in the wellbore. The pulsed neutron log may gather data on gas effect and fluid flow behind and between casing strings. The sonic tool may gather data on the cement bond between the casing and the cement and the cement and the formation.

A hybrid tool string 3000 may be assembled by connecting a conveyance string 100 to a gamma ray/casing collar telemetry module 110; connecting a flexible sub 300 at first end to a sonic array tool 200; connecting a pulsed neutron tool 400 at a second end of the flexible sub. A first memory module 150 may be connected to the pulsed neutron tool 400. If desired, a second memory module 150 may be connected to the sonic tool 200. Alternatively, the pulsed neutron tool 400 may be disposed above the flexible sub 300 and the sonic array tool 200 may be disposed below the flexible sub 300. In operation, the tool string 3000 is lowered into the cased wellbore via the electric mono-cable. The tool string is passed inside the casing across one or more geologic formations outside of the cased wellbore. Data is collected with the sonic array tool and the pulsed neutron tool and all or a portion of the collected data is transmitted via the electric mono-cable to a CPU 510 located at the surface of the earth. A portion of the collected data may be stored in the memory module(s) 150. The tool string is removed from the wellbore and the collected data is processed in combination with the data transmitted to the surface via the mono-cable to obtain selected rock property data about the one or more geologic formations. The rock properties are selected from the group consisting of Poisson's Ratio, Young's Modulus, compressional slowness, shear slowness, minimum horizontal stress profile, porosity, simple mineralogy, matrix sigma, and pseudo density. Additionally, the tool string 300 may gather data for determining the integrity of one or more casing strings and cement in the wellbore. The pulsed neutron log may gather data on gas effect and fluid flow behind and between casing strings. The sonic tool may gather data on the cement bond between the casing and the cement and the cement and the formation.

During operations of the combined tool string 1000, 2000, and 3000, data may be gathered simultaneously in one pass across the geologic formations by the sonic array tool 200 and the pulsed neutron tool 400. Alternatively, data may be gathered selectively by either the pulsed neutron tool 400 or the sonic array tool 2000 as the tool string 1000, 2000, and 3000 is passed one or more times across the selected geologic formation.

During operations of the combined tool string 1000, 2000, and 3000, data on the casing and cement integrity may be gathered simultaneously in one pass across the casing by the sonic array tool 200 and the pulsed neutron tool 400. Alternatively, data may be gathered selectively by either the pulsed neutron tool 400 or the sonic array tool 2000 as the tool string 1000, 2000, and 3000 is passed one or more times across the selected casing interval.

A number of implementations have been described. Nevertheless, it will be understood that various modifications may be made. Accordingly, other implementations are within the scope of the following claims:

What is claimed is:

1. A through casing formation evaluation tool, said tool comprising:
   a conveyance string;
   a tool string including:
   a sonic array tool and a pulsed neutron tool adapted to collect data about one or more geologic formations located adjacent to a wellbore casing wall in a single pass of the tool string across the one or more geologic formations; and
   a flexible sub connected at a first end to the sonic array tool and a second end of the flexible sub connected to a pulsed neutron tool.

2. The formation evaluation tool of claim 1 wherein the tool string further includes at least one memory module.

3. The formation evaluation tool of claim 1 wherein the tool string further includes memory module connected to the sonic array tool.

4. The formation evaluation tool of claim 1 wherein the tool string further includes a memory module connected to the pulsed neutron tool.

5. The formation evaluation tool of claim 1 further including a gamma ray/casing collar locator.

6. The tool of claim 1 wherein the conveyance string includes at least one of an electrical wireline cable, a fiber optic cable, a slickline, a coiled tubing string, a wired coiled tubing string and a continuous wired rod.

7. The tool of claim 1 wherein the tool further gathers data that is processed in a CPU to determine casing and/or cement integrity.

8. A method of through casing formation evaluation comprising:
   inserting a conveyance string with a tool string connected thereto into a cased wellbore having a wellbore casing wall disposed adjacent one or more geologic formations, said tool string comprising a sonic array tool, and a pulsed neutron tool;
   passing the tool string inside the wellbore casing across the one or more geologic formations located outside of and adjacent the wellbore casing wall;
   simultaneously collecting data through the wellbore casing wall about the one or more geologic formations located adjacent to the wellbore casing wall with the sonic array tool and the pulsed neutron tool in a single pass of the tool string across the one or more geologic formations;
   transmitting the collected data via the conveyance string to a CPU located at the surface of the earth; and
   processing the collected data from both the sonic array tool and the pulsed neutron tool to obtain selected rock property data about the one or more of the geologic formations.

9. The method of claim 8 wherein the conveyance string includes at least one of an electrical wireline cable; a fiber optic cable; a slickline; a coiled tubing string; a wired coiled tubing string; and a continuous wired rod.

10. The method of claim 8 wherein the rock property is selected from the group consisting of Poisson's Ratio, Young's Modulus, compressional slowness, shear slowness, minimum horizontal stress profile, porosity, simple mineralogy, matrix sigma, and pseudo density.

11. The method of claim 8 further including:
    passing the tool string inside the wellbore casing across at least one selected cased hole interval;
    collecting data with the sonic array tool regarding cement bond and the pulsed neutron tool regarding at least one of gas effect or fluid flow outside a wellbore casing wall proximal to the at least one cased hole interval and transmitting the collected data via the conveyance string to a CPU located at the surface of the earth; and
    processing the collected data from both the sonic array tool and the pulsed neutron tool to obtain selected data for determining casing and cement integrity about the at least one selected cased hole interval.

12. The method of claim 8 wherein processing the collected data comprises deriving a rock property determined from the collected data wherein the rock property is selected from the group consisting of Poisson's Ratio, Young's Modulus, compressional slowness, shear slowness, minimum horizontal stress profile; and wherein the method further comprises designing hydraulic fracture and/or acidization stimulation and placement using one or more of the derived rock properties.

13. The method of claim 8 wherein processing the collected data comprises: deriving a rock property determined from the collected data wherein the rock property is selected from the group consisting of porosity, simple mineralogy, matrix sigma, pseudo density; and wherein the method further comprises determining hydrocarbon saturations in selected intervals and designing hydraulic fracture and/or acidization stimulation and placement using the determined hydrocarbon saturations.

14. A method of through casing formation evaluation comprising:
    inserting a conveyance string with a tool string connected thereto into a cased wellbore, said tool string comprising at least one memory module, a sonic array tool, and a pulsed neutron tool;
    passing the tool string across one or more geologic formations located outside of and adjacent to a wellbore casing wall of the cased wellbore;
    simultaneously collecting data through the wellbore casing wall with the sonic array tool and the pulsed neutron tool about the one or more geologic formations located adjacent to the wellbore casing wall in a single pass of the tool string across the one or more geologic formations;
    storing the data in the memory module;
    removing the tool string from the wellbore;
    loading the collected data stored in the at least one memory module in a CPU located at the surface of the earth; and
    processing the collected data from both the sonic array tool and the pulsed neutron tool in a CPU located at the surface of the earth to obtain selected rock property data about the one or more geologic formations.

15. The method of claim 14 further including:
    passing the tool string inside the wellbore casing across at least one selected cased hole interval;
    collecting data with the sonic array tool regarding cement bond and the pulsed neutron tool regarding at least one of gas effect or fluid flow outside a wellbore casing wall proximal to the at least one cased hole interval and storing a portion of the collected data in the at least one memory module disposed in the tool string;
    removing the tool string from the wellbore;
    loading the collected data stored in the at least one memory module in a CPU located at the surface of the earth; and
    processing the collected data from both the sonic array tool and the pulsed neutron tool in the CPU located at the surface of the earth to obtain selected data for determining casing and cement integrity about the at least one selected cased hole interval.

16. The method of claim 14 wherein processing the collected data comprises deriving a rock property determined from the collected data wherein the rock property is selected from the group consisting of Poisson's Ratio, Young's Modulus, compressional slowness, shear slowness, minimum horizontal stress profile; and wherein the method further comprises designing hydraulic fracture and/or acidization stimulation and placement using one or more of the derived rock properties.

17. The method of claim 14 wherein processing the collected data comprises: deriving a rock property determined from the collected data wherein the rock property is selected from the group consisting of porosity, simple mineralogy, matrix sigma, pseudo density; and
　　determining hydrocarbon saturations in selected intervals and designing hydraulic fracture and/or acidization stimulation and placement using the determined hydrocarbon saturations.

18. A method of through casing formation evaluation comprising:
　　inserting a conveyance string with a tool string connected thereto into a cased wellbore, said tool string comprising a sonic array tool and a pulsed neutron tool and at least one memory module;
　　passing the tool string inside the wellbore casing across one or more geologic formations located outside of and adjacent to a wellbore casing wall;
　　simultaneously collecting data through the casing wall with the sonic array tool and the pulsed neutron tool about the one or more geologic formations located outside of and adjacent to the wellbore casing wall in a single pass of the tool string across the one or more geologic formations;
　　transmitting at least a portion of the collected data via the conveyance string to a CPU located at the surface of the earth;
　　storing at least a portion of the collected data in the at least one memory module;
　　removing the tool string from the wellbore;
　　loading the collected data stored in the at least one memory module in a CPU located at the surface of the earth; and
　　processing the collected data from both the sonic array tool and the pulsed neutron tool in the CPU located at the surface of the earth to obtain selected rock property data about the one or more geologic formations.

19. The method of claim 18 further including:
　　passing the tool string inside the wellbore casing across at least one selected cased hole interval;
　　collecting data with the sonic array tool regarding cement bond and the pulsed neutron tool regarding at least one of gas effect or fluid flow outside a wellbore casing wall proximal to the at least one cased hole interval and storing a portion of the collected data in the at least one memory module disposed in the tool string;
　　removing the tool string from the wellbore;
　　loading the collected data stored in the at least one memory module in a CPU located at the surface of the earth; and
　　processing the collected data from both the sonic array tool and the pulsed neutron tool in the CPU located at the surface of the earth to obtain selected data for determining casing and cement integrity about the at least one selected cased hole interval.

20. The method of claim 18 wherein processing the collected data comprises deriving a rock property determined from the collected data wherein the rock property is selected from the group consisting of Poisson's Ratio, Young's Modulus, compressional slowness, shear slowness, minimum horizontal stress profile; and wherein the method further comprises designing hydraulic fracture and/or acidization stimulation and placement using one or more of the derived rock properties.

21. The method of claim 18 further including grouping intervals for stimulation and selection of perforation intervals for hydraulic fracturing initiation points.

22. A through casing formation evaluation tool, said tool comprising:
　　a conveyance string; and
　　a tool string including: a sonic array tool and a pulsed neutron tool adapted to collect data about one or more geologic formations located adjacent to a wellbore casing wall in a single pass of the tool string across the one or more geologic formations; and
　　wherein the tool is adapted to collect data simultaneously in a single pass.

23. A method of through casing formation evaluation comprising:
　　inserting a conveyance string with a tool string connected thereto into a cased wellbore having a wellbore casing wall disposed adjacent one or more geologic formations, said tool string comprising a sonic array tool, and a pulsed neutron tool;
　　passing the tool string inside the wellbore casing across the one or more geologic formations located outside of and adjacent the wellbore casing wall;
　　collecting data through the wellbore casing wall about the one or more geologic formations located adjacent to the wellbore casing wall with the sonic array tool and the pulsed neutron tool in a single pass of the tool string across the one or more geologic formations;
　　transmitting the collected data via the conveyance string to a CPU located at the surface of the earth; and
　　processing the collected data from both the sonic array tool and the pulsed neutron tool to obtain selected rock property data about the one or more of the geologic formations, wherein processing the collected data comprises deriving a rock property determined from the collected data wherein the rock property is selected from the group consisting of Poisson's Ratio, Young's Modulus, compressional slowness, shear slowness, minimum horizontal stress profile; and
　　designing hydraulic fracture and/or acidization stimulation and placement using one or more of the derived rock properties, wherein designing includes:
　　　　identifying ductile and brittle intervals in the one or more geologic formations; and
　　　　identifying and grouping intervals of the one or more geologic formations together for hydraulic fracture stimulation in a single stage.

24. The method of claim 23 wherein grouping intervals for stimulation further includes selection of perforation intervals for hydraulic fracturing initiation points.

25. A method of through casing formation evaluation comprising:
　　inserting a conveyance string with a tool string connected thereto into a cased wellbore having a wellbore casing wall disposed adjacent one or more geologic formations, said tool string comprising a sonic array tool, and a pulsed neutron tool;
　　passing the tool string inside the wellbore casing across the one or more geologic formations located outside of and adjacent the wellbore casing wall;
　　collecting data through the wellbore casing wall about the one or more geologic formations located adjacent to the wellbore casing wall with the sonic array tool and the pulsed neutron tool in a single pass of the tool string across the one or more geologic formations;

transmitting the collected data via the conveyance string to a CPU located at the surface of the earth;

processing the collected data from both the sonic array tool and the pulsed neutron tool to obtain selected rock property data about the one or more of the geologic formations;

passing the tool string inside the wellbore casing across at least one selected cased hole interval;

collecting data with the sonic array tool regarding cement bond in the selected cased hole interval; and processing the collected data from the sonic array tool in the CPU located at the surface of the earth to obtain selected data for determining cement integrity about the at least one selected cased hole interval;

determining if there is hydraulic zonal isolation between portions of the selected cased hole interval; and selecting intervals for selective staging of hydraulic stimulation based on the determined hydraulic zonal isolation.

26. A method of reducing total well drilling and completion costs comprising:

drilling a well bore to total depth;

running a string of casing to total depth in the well without running an open hole sonic and pulsed neutron log in an open hole portion of the wellbore;

cementing said string of casing in the wellbore to form a cased wellbore;

inserting a conveyance string with a tool string connected thereto into the cased wellbore, said cased wellbore having a wellbore casing wall disposed adjacent one or more geologic formations, said tool string comprising a sonic array tool, and a pulsed neutron tool;

passing the tool string inside the cased wellbore casing across the one or more geologic formations located outside of and adjacent the wellbore casing wall;

simultaneously collecting data in a single pass through the wellbore casing wall about the one or more geologic formations located adjacent to the wellbore casing wall with the sonic array tool and the pulsed neutron tool and transmitting the collected data via the conveyance string to a CPU located at the surface of the earth;

processing the collected data from both the sonic array tool and the pulsed neutron tool to obtain selected rock property data about the one or more of the geologic formations;

designing hydraulic fracture and/or acidization stimulation design and placement using the selected rock properties; and conducting completion operations on the wellbore, said completion operations comprising conducting the fracture and/or acidization stimulation in accordance with the design.

27. The method of claim 26 wherein stimulation design and placement comprises identifying ductile and brittle intervals in the one or more geologic formations and identifying and grouping intervals of the one or more geologic formations together for stimulation in a single stage.

28. A method of reducing total well drilling and completion costs comprising:

drilling a well bore to total depth;

running a string of casing to total depth in the well without running an open hole sonic and pulsed neutron log in an open hole portion of the wellbore;

cementing said string of casing in the wellbore to form a cased wellbore;

inserting a conveyance string with a tool string connected thereto into the cased wellbore, said cased wellbore having a wellbore casing wall disposed adjacent one or more geologic formations, said tool string comprising a sonic array tool, and a pulsed neutron tool;

passing the tool string inside the cased wellbore casing across the one or more geologic formations located outside of and adjacent the wellbore casing wall;

collecting data in a single pass through the wellbore casing wall about the one or more geologic formations located adjacent to the wellbore casing wall with the sonic array tool and the pulsed neutron tool and transmitting the collected data via the conveyance string to a CPU located at the surface of the earth;

processing the collected data from both the sonic array tool and the pulsed neutron tool to obtain selected rock property data about the one or more of the geologic formations;

designing hydraulic fracture and/or acidization stimulation design and placement using the selected rock properties;

conducting completion operations on the wellbore, said completion operations comprising conducting the fracture and/or acidization stimulation in accordance with the design;

passing the tool string inside the wellbore casing across at least one selected cased hole interval;

collecting data with the sonic array tool regarding cement bond in the selected cased hole interval; and processing the collected data from the sonic array tool in the CPU located at the surface of the earth to obtain selected data for determining cement integrity about the at least one selected cased hole interval;

determining if there is hydraulic zonal isolation between portions of the selected cased hole interval; and selecting intervals for selective staging of hydraulic stimulation based on the determined hydraulic zonal isolation.

29. A method of through casing formation evaluation comprising:

inserting a conveyance string with a tool string connected thereto into a cased wellbore, said tool string comprising at least one memory module, a sonic array tool, and a pulsed neutron tool;

passing the tool string across one or more geologic formations located outside of and adjacent to a wellbore casing wall of the cased wellbore;

collecting data through the wellbore casing wall with the sonic array tool and the pulsed neutron tool about the one or more geologic formations located adjacent to the wellbore casing wall in a single pass of the tool string across the one or more geologic formations;

storing the data in the memory module;

removing the tool string from the wellbore;

loading the collected data stored in the at least one memory module in a CPU located at the surface of the earth; and processing the collected data from both the sonic array tool and the pulsed neutron tool in a CPU located at the surface of the earth to obtain selected rock property data about the one or more geologic formations; and designing hydraulic fracture and/or acidization stimulation and placement using one or more of the derived rock properties, wherein designing includes:

identifying ductile and brittle intervals in the one or more geologic formations, and identifying and grouping intervals of the one or more geologic formations together for hydraulic fracture stimulation in a single stage.

30. The method of claim 29 wherein grouping intervals for stimulation further includes selection of perforation intervals for hydraulic fracturing initiation points.

31. A method of through casing formation comprising:
inserting a conveyance string with a tool string connected thereto into a cased wellbore, said tool string comprising at least one memory module, a sonic array tool, and a pulsed neutron tool;
passing the tool string across one or more geologic formations located outside of and adjacent to a wellbore casing wall of the cased wellbore;
collecting data through the wellbore casing wall with the sonic array tool and the pulsed neutron tool about the one or more geologic formations located adjacent to the wellbore casing wall in a single pass of the tool string across the one or more geologic formations;
storing the data in the memory module;
removing the tool string from the wellbore;
loading the collected data stored in the at least one memory module in a CPU located at the surface of the earth; and
processing the collected data from both the sonic array tool and the pulsed neutron tool in a CPU located at the surface of the earth to obtain selected rock property data about the one or more geologic formations
passing the tool string inside the wellbore casing across at least one selected cased hole interval;
collecting data with the sonic array tool regarding cement bond in the selected cased hole interval; and
processing the collected data from the sonic array tool in the CPU located at the surface of the earth to obtain selected data for determining cement integrity about the at least one selected cased hole interval;
determining if there is hydraulic zonal isolation between portions of the selected cased hole interval; and
selecting intervals for selective staging of hydraulic stimulation based on the determined hydraulic zonal isolation.

32. A method of through casing formation evaluation comprising:
inserting a conveyance string with a tool string connected thereto into a cased wellbore, said tool string comprising a sonic array tool and a pulsed neutron tool and at least one memory module;
passing the tool string inside the wellbore casing across one or more geologic formations located outside of and adjacent to a wellbore casing wall;
collecting data through the casing wall with the sonic array tool and the pulsed neutron tool about the one or more geologic formations located outside of and adjacent to the wellbore casing wall in a single pass of the tool string across the one or more geologic formations; and
transmitting at least a portion of the collected data via the conveyance string to a CPU located at the surface of the earth;
storing at least a portion of the collected data in the at least one memory module;
removing the tool string from the wellbore;
loading the collected data stored in the at least one memory module in a CPU located at the surface of the earth; and
processing the collected data from both the sonic array tool and the pulsed neutron tool in the CPU located at the surface of the earth to obtain selected rock property data about the one or more geologic formations;
identifying ductile and brittle intervals in the one or more geologic formations; and
identifying and grouping intervals of the one or more geologic formations together for hydraulic fracture stimulation in a single stage.

33. A method of through casing formation evaluation comprising:
inserting a conveyance string with a tool string connected thereto into a cased wellbore, said tool string comprising a sonic array tool and a pulsed neutron tool and at least one memory module;
passing the tool string inside the wellbore casing across one or more geologic formations located outside of and adjacent to a wellbore casing wall;
collecting data through the casing wall with the sonic array tool and the pulsed neutron tool about the one or more geologic formations located outside of and adjacent to the wellbore casing wall in a single pass of the tool string across the one or more geologic formations; and
transmitting at least a portion of the collected data via the conveyance string to a CPU located at the surface of the earth;
storing at least a portion of the collected data in the at least one memory module;
removing the tool string from the wellbore;
loading the collected data stored in the at least one memory module in a CPU located at the surface of the earth; and
processing the collected data from both the sonic array tool and the pulsed neutron tool in the CPU located at the surface of the earth to obtain selected rock property data about the one or more geologic formations and deriving a rock property determined from the collected data wherein the rock property is selected from the group consisting of porosity, simple mineralogy, matrix sigma, pseudo density; and
determining hydrocarbon saturations in selected intervals and designing hydraulic fracture and/or acidization stimulation and placement using the determined hydrocarbon saturations.

34. A method of through casing formation evaluation comprising:
inserting a conveyance string with a tool string connected thereto into a cased wellbore, said tool string comprising a sonic array tool and a pulsed neutron tool and at least one memory module;
passing the tool string inside the wellbore casing across one or more geologic formations located outside of and adjacent to a wellbore casing wall;
collecting data through the casing wall with the sonic array tool and the pulsed neutron tool about the one or more geologic formations located outside of and adjacent to the wellbore casing wall in a single pass of the tool string across the one or more geologic formations; and
transmitting at least a portion of the collected data via the conveyance string to a CPU located at the surface of the earth;
storing at least a portion of the collected data in the at least one memory module;
removing the tool string from the wellbore;
loading the collected data stored in the at least one memory module in a CPU located at the surface of the earth; and
processing the collected data from both the sonic array tool and the pulsed neutron tool in the CPU located at the surface of the earth to obtain selected rock property data about the one or more geologic formations;
passing the tool string inside the wellbore casing across at least one selected cased hole interval;
collecting data with the sonic array tool regarding cement bond in the selected cased hole interval; and
processing the collected data from the sonic array tool in the CPU located at the surface of the earth to obtain selected data for determining cement integrity about the at least one selected cased hole interval;

determining if there is hydraulic zonal isolation between portions of the selected cased hole interval; and selecting intervals for selective staging of hydraulic stimulation based on the determined hydraulic zonal isolation.

* * * * *